United States Patent [19]
Tauzin

[11] 3,747,974
[45] July 24, 1973

[54] CONVERTIBLE SEAT FOR CABLEWAYS

[75] Inventor: Francis Tauzin, Veyrins, France

[73] Assignees: Pomagalski S.A., Grenoble; Sigma Plastique, Veyrins, both of France

[22] Filed: June 25, 1971

[21] Appl. No.: 156,797

[52] U.S. Cl................... 297/184, 104/59, 105/150, 105/329 SC
[51] Int. Cl............................................. A49b 19/00
[58] Field of Search..................... 135/4 R; 5/67, 68; 105/150, 322, 323, 333, 343; 104/59, 68, 89, 112, 173; 297/184, 17

[56] References Cited
UNITED STATES PATENTS
3,170,412  2/1965  Sowder ............................. 105/329
3,556,014  1/1971  Rudkin, Jr. ....................... 105/329
3,596,612  8/1971  Sowde................................ 297/17

Primary Examiner—James T. McCall
Assistant Examiner—Garry Moore
Attorney—William C. Linton and Ulle C. Linton

[57] ABSTRACT

The convertible seat comprises a chassis, a lower shell forming a sheilding bucket which surrounds said chassis and a transparent hemispheric cupola hinged about a diametral axis. A rapid assembling and disassembling of the convertible seat is obtained by means of a dismountable member operating as a hinge axis for the cupola and as securing axis on the seat frame for the shell. A compensating device, comprising a compensating spring associated to an adjustable friction means, is provided to balance the weight of the cupola and for damping the shocks against the stops at the end of the strokes of the cupola.

7 Claims, 7 Drawing Figures

Patented July 24, 1973
3,747,974
4 Sheets-Sheet 1
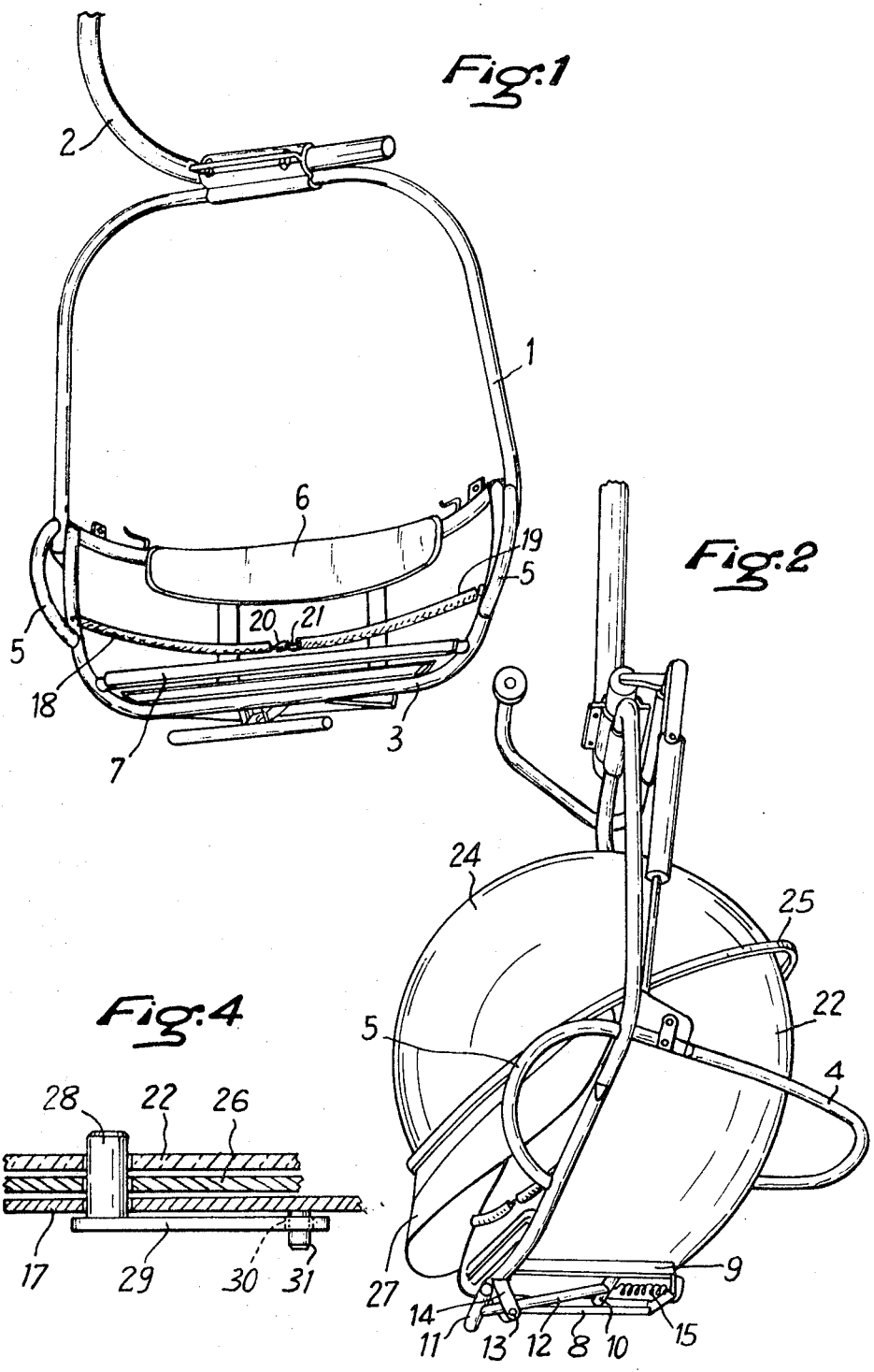
INVENTOR
FRANCIS TAUZIN
By Linton and Linton
ATTORNEYS Patented July 24, 1973

INVENTOR
FRANCIS TAUZIN

By Linton and Linton
ATTORNEYS

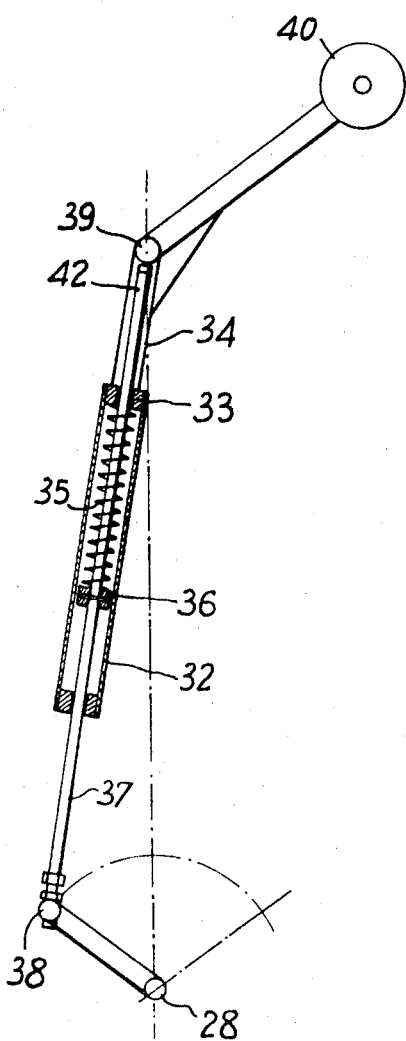
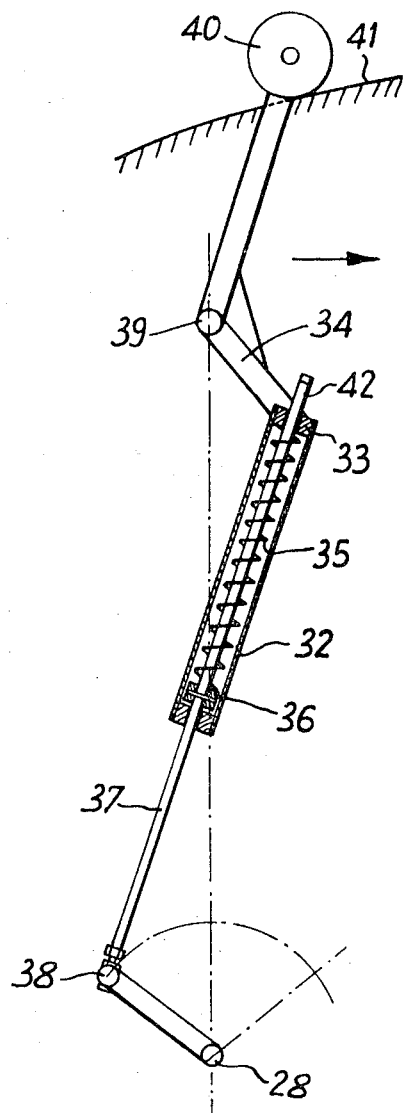
INVENTOR
FRANCIS TAUZIN
By Linton and Linton
ATTORNEYS

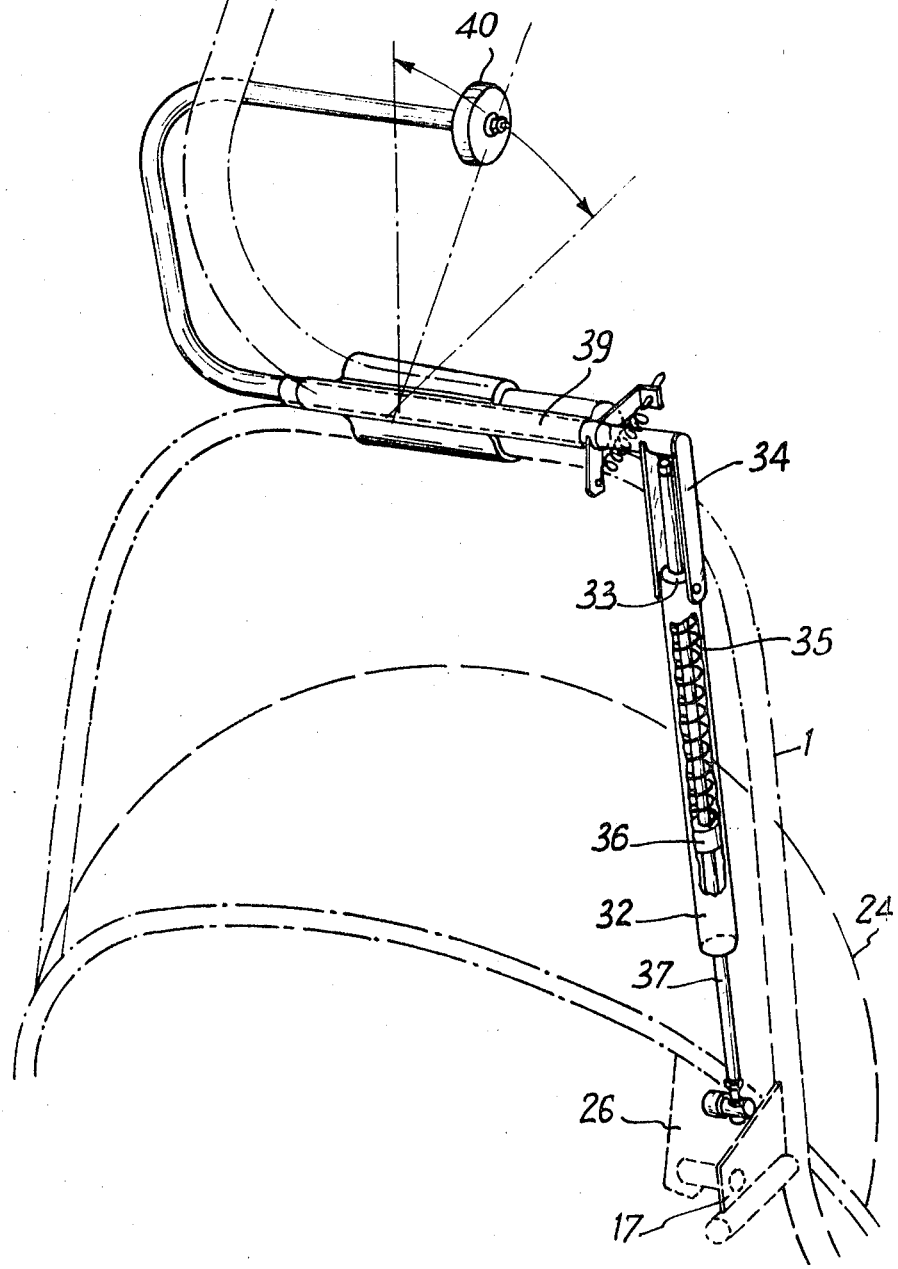

3,747,974

CONVERTIBLE SEAT FOR CABLEWAYS

FIELD OF THE INVENTION

The invention relates generally to seats for cableways arranged so that the skiers can board the seats and get off therefrom during the movement of seats without the need for them to take off the skis from their feet. Such seats are very simple and practical but their main inconvenience is to let the skiers be exposed to bad weather during their conveyance.

DESCRIPTION OF THE PRIOR ART

It was therefore proposed to provide seats with a shielding body rotatable about a horizontal axis for protecting, when tilted down, the bodies of the skiers, thus converting each seat into a cabin from which emerge only the legs of the skiers wearing the skis which are set on the usual foot-rest.

However the arrangement of seats thus provided with a protection involves a high cost which is not convenient when the protection against bad weather is not necessary. On the other hand, in the case of storms or of periods of time without use, the fragile surfaces of the cabin are not readily dismountable by a mere attendant.

SUMMARY OF THE INVENTION

An object of the present invention is to respond to the need of seats for cableways of the conventional kind on which the utilizer may, optionally and only for a part of the number of seats, secure instantaneously the necessary members for converting a conventional seat for cableways into a protected cabin.

The movable shielding body consists partly of a transparent hemispheric cupola, for example in a transparent plastic material, hinged about a diametral axis. The other part of the shielding body consists of a lower shell forming a shielding bucket which surrounds the lower surface of the proper seat.

The shielding body according to the invention is characterized more particularly by rapid assembling and disassembling means consisting in a dismountable member operating as a hinge axis for the cupola and as a securing axis on the seat frame for the shell which constitutes the protecting bucket.

The cupola is edged on its front part by a rubber skirt which, when the cupola is raised, protects the heads of the skiers whereas, when the cupola is lowered, it protects the legs of the skiers while allowing the hands of the seated skiers, to grasp the handles to which they can cling for boarding the seat during the movement thereof as well as for catching in front of the empty space before having lowering the cupola.

Internally the cupola has, before the passengers, a protecting flange for permitting its operation by hand. According to a modification, to the manual control of the cupola may be added an automatic control by a cam having a delayed effect and means for limiting the force, said control taking from the cabin energy that part of energy necessary for opening and closing the cupola, this part of energy being stored by a device which can return it gradually in order to ensure a smooth actuation. At this effect, a cam of a small length, arranged on the path of the cabin, actuates an energy storing device provided on the cabin for taking the necessary energy during the small period of the movement along the cam in order to return it gradually during a much longer time to the operating mechanism of the cupola.

In order to balance the weight of the cupola the hinge axis of which is set off substantially rearwardly with respect to its centre of gravity and for damping the shocks against the stops at the end of the stroke, a compensating spring is provided and this spring is associated to an adjustable friction means consisting of a rubber joint which slides in a cylinder containing the compensating spring. In the case of the automatic control of the cupola, the energy storing means can conveniently consist in the balancing means for the cupola. The bottom of the cylinder for the balancing means is then hinged to an axis secured at the end of a lever which can be rotated with respect to the frame in an intermediate point and which carries, at its other end a roller adapted to meet, in some places of the seat course, oblique cams forcing the roller to move in height in one direction or in the other to give to the spring a direction and a lengthening which transmit to the cupola a torque exceeding that necessary for the balance, thus causing the opening or closing actuation of the cupola in a time extending well beyond the actual action of the cam.

BRIEF DESCRIPTION OF THE DRAWING

One embodiment of the invention will be now described, by way of example, with reference to the annexed drawings, in which :

FIG. 1 is a front view of a seat according to the invention adapted for receiving the lower shell and the hinged cupola which are the parts of the rapidly mountable and dismountable cabin ;

FIG. 2 is a perspective side view of the seat shown in FIG. 1, which is provided with a cabin, shown in the closed position, the movement of the cupola being controlled automatically ;

FIG. 4 is a detail view on a large scale of the assembling means of the bucket and cupola ;

FIGS. 5 and 6 are views showing an embodiment of the control of the movement of the hinged cupola under the automatical action of controlling cams ; and FIG. 7 is a view showing the combination of the actuating mechanism for the cupola, the energy accumulator and the device which is actuated by the controlling cams.

DESCRIPTION OF THE PREFERRED EMBODIMENT

Figure 3:
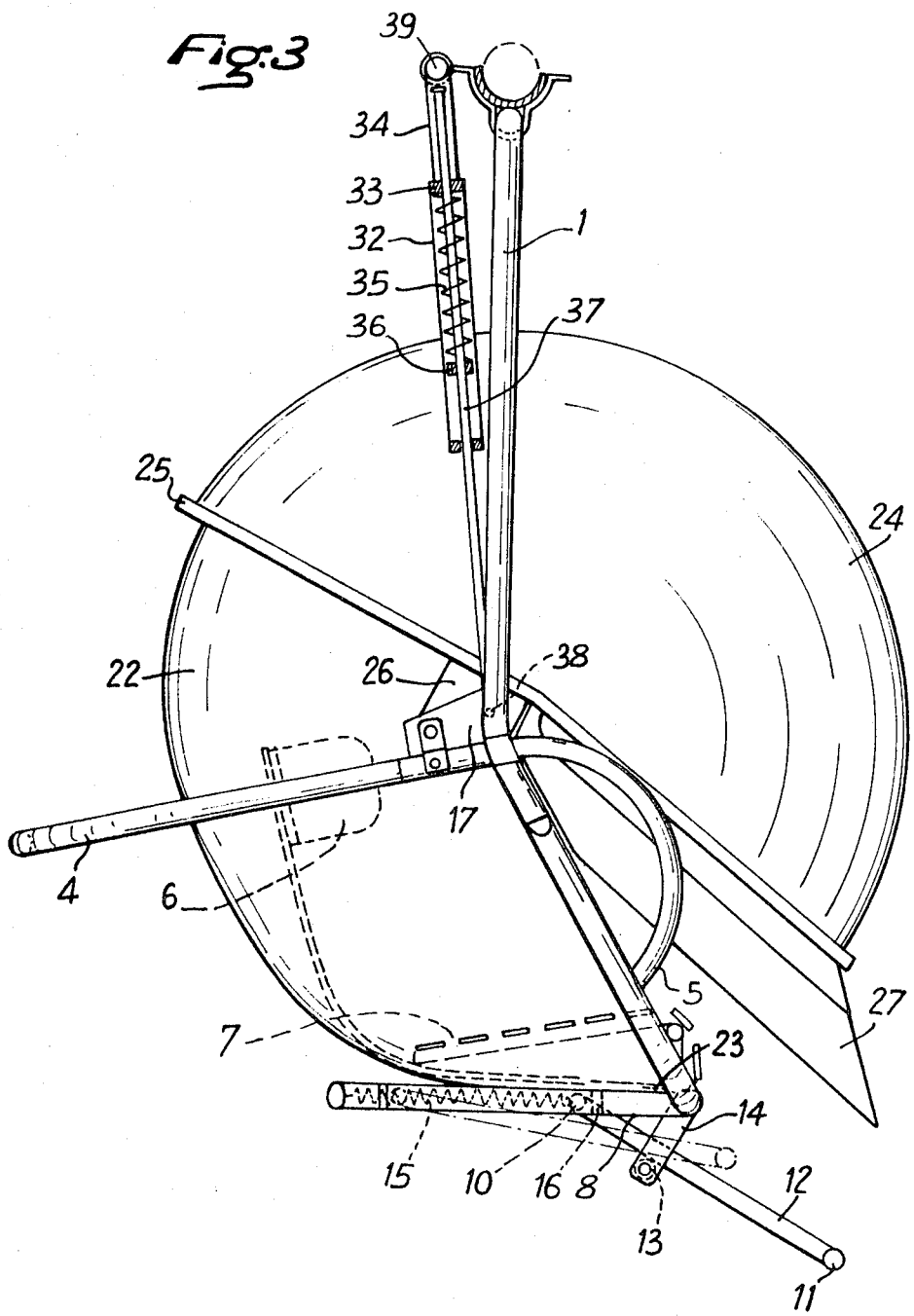
FIG. 3 is another side view of the seat and the cabin.

The seat chassis according to the invention can have a generally conventional structure. In the example shown, it comprises a frame 1 the curved upper part of which is secured at its top to a curved support 2 having its upper end attached to a bearing and pulling cable. This frame is rigid with a seat support 3, a bow-shaped rear bumper 4 and lateral handles 5 and its main parts can be for example metal tubes which are welded one to the others or any other suitable elements. The seat support 3 carries a back 6 and receives a bench 7, for example for two passengers seated side by side.

According to a feature of the invention, this frame is rigid at its bottom with a support for a ski-rest consisting in two parallel slides 8–9 in which can slide and roll the two ends of a transverse bar 10 rigid with a rest transverse bar 11 on which can rest the feet or skis through a tie-bar 12 which can itself rest on a grooved pulley 13 carried by a yoke 14 connected to the frame. A traction spring 15 holds the ski-rest in place normally retracted under the frame as shown on FIGS. 1 and 2.

When the ski-rest is used, the rest transverse bar 11 is displaced forwardly and downwardly, the spring 15 is lengthened so that the transverse bar 10 reaches at the end of its stroke the stops 16 provided on the two slides 8-9. The invention provides that the transverse bar 11, when retracted, has a position at some centimetres from upper stops provided for the transverse bar 11 in order to allow the passengers to engage their skis between the bottom of the frame and the upper surface of the rest transverse bar 11 for permitting then the projection of the ski-rest by a subsequent action of the skis or the feet. The rest transverse bar 11 is then repulsed forwardly till to the abutting position permitting a normal rest. Furthermore, when the cabin arrives behind the skiers for being boarded during its movement, the rest transverse bar , slightly projecting, makes with the skier legs a warning contact for the instant at which the skiers must seat on the bench. As this rest transverse bar, at the time of such contact, is elastically connected to the frame in which it can retract by some centimetres, there is a contact between the skier legs and a light and retractable member before the contact of the skier with the whole mass of the cabin.

On each side, the frame 1 is rigid with a lateral bracket 17 serving to the mounting of the bucket and the transparent hinged cupola, as it will be explained hereafter.

At both sides of the frame are attached two flexible elements 18-19 of a safety chain within a rubber or plastic sheath. These two elements have thus a reduced length approximately equal to the half of the seat breadth and they can thus depend freely without any inconvenience when they are not used. One of them is ended for example with a ring 20 while the other is ended with a safety hook 21 for allowing to attach them easily one to the other but it is understood that any other attaching means can be used for these two elements.

The shell 22, which can be in a rigid plastic material, has the general shape of a suitably curved bucket for surrounding downwardly the seat support 3 and it has on each side a fitting adapted for the passage therethrough of a mounting spindle engaged through the fixed lateral bracket 17 while its lower edge carries, centrally in the symmetry vertical plane of the bucket, a fastener or several fasteners 23 adapted for being hooked to the support of the ski-rest.

The cupola 24, preferably wholly in transparent platic material, has a generally hemispheric shape limited by a circle 25 which bears a movable bracket 26 acting as a bearing for the hinge spindle. To the circle 25 is secured at the front of the cupola, a flexible skirt 27 made of rubber or an equivalent material and adapted for applyin itself on the legs of the passengers when the cupola is in its closed position.

The circle 25 bears internally on its front part one or several projecting flanges allowing the passengers to actuate the cupola by hand.

The mounting of the shell and the cupola is carried out readily in a very simple manner by engaging two lateral spindles 28 through the fixed brackets 17 of the frame. Each spindle 28 is a part of a member having a locking arm 29 which is perpendicular to the hinge spindle and provided with a notch 30 adapted for being hooked, by a rotation of the member, into a suitable groove of a pin 31 carried by each bracket 17. It will be appreciated however that this arrangement is only indicated by way of example, the important feature being only that each hinge spindle 28 has a locking means ensuring its safe immobilisation on the seat frame 1 when the shell and the cupola have been mounted thereon. The spindles 28 act as pivots for the cupola which, in its opened position, is raised forwardly whereas its rear part surrounds the rear part of the shell 22, passing between this shell and the bumper 4.

The device for balancing the hinged cupola 24 and damping its movement will be now described. This device is located in a cylinder 32 the upper end 33 of which is connected by links 34 and by a swivelling shaft 39 to the frame 1. At the upper end 33 of the cylinder is attached the end of a traction spring 35 arranged within the cylinder 32 and acting as a balancing spring. The other end of the traction spring 35 is attached to a piston 36 sliding within the cylinder and consisting in a rubber disc secured to a piston rod 37 connected to the cupola bracket 26 in a point 38 which is excentered with respect to the hinge axis of the cupola. The rubber disc exerts a damping friction on the internal surface of the cylinder 32 and such friction can be made adjustable by actuation of a pressing nut which, when compressing the disc axially, causes its radial expansion, thus increasing the damping friction.

The hinged cupola has a possibility of a suitable angular movement, for example about 120°, during which the centre of gravity of said cupola describes an arc of circle approximately symmetrical with respect to a vertical plane passing the hinge axis ; in other words, during an opening or closing operation, the centre of gravity of the cupola will raise in the first half of its stroke and then is lowered. The connecting point 38 is such selected that it describes also an arc of circle which raises and then goes down in such a manner that the spring tension passes through a minimum or will become zero when the centre of gravity moves past the vertical plane which contains the hinge axis of the cupola. A suitable balancing of the weight of the cupola is thus obtained, whereas the damping effect of the friction exerted by the piston 36 avoids the shocks of the cupola against its stops (not shown) at the end of its stroke ; said stops can consist in rubber pads or equivalent means. The balancing of the cupola obtained by means of the spring can be only partial in order that the cupola tends to remain at one or the other end positions in which the centre of gravity is in its lowerst position.

The seat for cableways according to the invention can be provided with all useful accesories. For example, the frame 1 can be provided with lateral stickholders for receiving the ski-sticks of the passengers.

The mounting operation of the cabin will be now briefly explained and it will be appreciated that the dismounting operations will be carried out by an inversed process. For dismounting the cupola, the cyoinder end 33 is separated from the links 34 while a traction is exerted upwardly on the cylinder 32 and the two lateral spindles 28 are removed after having been unlocked by a rotation of their locking arms 29. It is then possible to remove the cupola. When the spindles 28 have been removed, the lower fasteners 23 can be separated from the frame 1 and the shell becomes free for being removed. Thus the operations are particularly simple and rapid without requiring the help of a specialist.

In the FIGS. 5 to 7 is shown an automatical control means for moving the cupola 24.

The shaft 39 to which the cylinder 32 is connected through the links 34 can swivel in a bearing rigid with the frame 1 and it bears at its suitably directed free end a control roller 40 adapted for being actuated by suitable fixed cams when the roller passes along said cams. These cams are located above the roller for the automatical opening of the cupola and below it, as shown in 41 (FIG. 6) for the automatical closing. They operate in a vertical plane near the vertical plane containing the centre of gravity of the cabin, thus causing a minimal movement of said cabin. FIG. 5 shows the device for an opening position of the cupola before the roller 40 meets the closing cam 41. It is clear that the effect of the cam 41, by pivoting the shaft 39, pushes suddenly the hinge of the cylinder 32 with the links 34 to the closing side. Due to the spring connexion, the cupola follows only with a delay the motion of the hinge of the cylinder and the displacement of the hinge has for effect together to vary the direction of the spring device and to lengthen substantially the distance from the axis 38 to the cylinder hinge, thus increasing the traction of the spring 35 while its direction is varied in such a manner that the torque exerted on the cupola exceeds the effect of the weight of this cupola which is thus driven by the partial contraction of the spring 35 while the axis 38 raises and initiates the closing of the cupola, this motion continuing well beyond the passage along the cam 41.

When the roller comes beyond the cam, the links 34 become free and can return in line with the cylinder 32 under the action of the spring while the closing motion is completed by inertia, the axis 38 going down to the opening position, whereas the tension of the spring returns below the value which would balance the weight of the cupola.

From the above description, it is clear that the effect of the cams on the roller 40 adds to the balancing force of the spring 35 an additional force which tends to rock the cupola either towards the closing position if it is opened or towards the opening position if it is closed, depending from the position of the cams arranged at the starting and arrival stations of the cableway. This force is exerted only during the actuation of the roller 40. the cupola receives thus an impulsion of cinetic energy and, since it is balanced, it completes its stroke, after the actuation of the roller, like a free flywheel under the effect of the cinetic energy which was stored.

A limited quantity of energy is taken during a time which does not necessitate long cams without any risk of injuring the passengers or interfering with the possibility of a manual control. After the action of the cams, there is restitution of energy during a time well beyond that necessary for the receipt of the impulsion. To any overtension of the spring under the action of the roller corresponds an impulsion or, in other words, a recharging of the inertia accumulator constituted by the mass of the moving parts 32–35–36.

The device shown in FIGS. 5 and 6 comprises a locking means consisting in a pin 42 as an extension of the piston rod pivoting about the axis 38. In the position of FIG. 5, this pin is in front of the shaft 39 in such a manner that there is a locking of the cupola in the openng position and a similar locking is obtained in the same manner in the closing position. The action of a cam 41 on the roller 40, driving laterally the cylinder 32, unlocks the cupola before pushing it and on arrival against the stop on the opposite side, the cupola becomes again locked automatically when the links 34 are again in line with the cylinder 32.

It is important that the cabin, for example when it goes down the cableway being empty, does not tend to open under the action of a blast of wind because the aerodynamical drag of the cabine in the opening position would be dangerous for the installation since it would be much higher than the acceptable drag of the cabin in the closing position. If necessary, a biasing spring (not shown) will be provided for ensuring a normal return to the locking position when the control means has completed its function.

The sleeve by which the cabin is connected to the support 2 is conveniently fitted with a rubber sheath in such a manner that vibrations transmitted to the support by the carrying cable are not transfered to the upper curved part of the frame 1 and to the whole cabin.

What we claim is:

1. Convertible seat for cableways comprising a seat, a frame supporting said seat and adapted to be suspended to a supporting cable, a lower shell forming a shielding bucket which is disposed behind said seat and has its lower portion fastened in a separable manner to the bottom of said frame while presenting lateral openings registering with corresponding openings of said frame, a transparent upper cupola disposed in the front of said seat and presenting near its periphery holes registering with said openings of said lower shell and of said frame, lateral spindles introduced through the registering openings of said lower shell, said frame and the holes of said cupola and locked in this position, said spindles acting at the same time to ensure the fastening of said lower shell to said frame and the pivoted mounting of said cupola.

2. Convertible seat for cableways according to claim 1 including handles on said frame, a rubber skirt on the front of said cupola which, when the cupola is in a raised position, protects the head of the users in their standing position, ready to leave the seat, while in the lowered position of said cupola said skirt protects the legs of the seated users and allows the hands of said users to grasp said handles.

3. Convertible seat for cableways according to claim 2, including a piston rod, said cupola is pivoted, at a point set off with respect of the center of gravity of said cupola, to the end of said piston rod, a cylinder having said piston rod slideable therein, link means pivotally connecting said cylinder to said frame compensating spring enclosed in said cylinder, a piston element rigid with said piston rod and adapted to exert a friction effect against the inner wall of the cylinder and said compensating spring being positioned between the top of said cylinder and said piston element.

4. Convertible seat for cableways according to claim 2, includng horizontal parallel slides connected to the bottom of said frame, a longitudinal bar slideable on said slides, a pulley connected to said frame and having said bar slideable thereon, a spring connecting said rod to said slides and a transverse rod on the free end of said bar, adapted to receive the feet of a user seating on said seat.

5. Convertible seat for cableways according to claim 2, wherein a first element of a safety chain is secured at one side of said frame and a second element of a safety chain, of same length, is secured on the other side of said frame, said first and second elements being covered with a plastic sheath and complementary attaching means on the free ends of said chains in order to be attached one to the other to prevent the fall of passengers when the cupola is in its raised position.

6. Convertible seat for cableways according to claim 3 including automatic control means including fixed cams, a shaft linked to said cylinder and pivotally supported by said frame, a roller on said shaft and capable of moving along said cams to open and close said cupola.

7. Convertible seat for cableways according to claim 6 including means for preventing movement of said cupola when said automatic control means is not actuated.

* * * * *